(12) United States Patent
Suzuki et al.

(10) Patent No.: US 9,041,324 B2
(45) Date of Patent: May 26, 2015

(54) AC MOTOR CONTROL APPARATUS

(71) Applicant: DENSO CORPORATION, Kariya, Aichi-pref. (JP)

(72) Inventors: Takashi Suzuki, Anjo (JP); Takeshi Itoh, Nagoya (JP); Hirofumi Kako, Chita-gun (JP)

(73) Assignee: DENSO CORPORATION, Kariya (JP)

(*) Notice: Subject to any disclaimer, the term of this patent is extended or adjusted under 35 U.S.C. 154(b) by 121 days.

(21) Appl. No.: 13/867,282

(22) Filed: Apr. 22, 2013

(65) Prior Publication Data

US 2013/0278184 A1    Oct. 24, 2013

(30) Foreign Application Priority Data

Apr. 22, 2012    (JP) .................................. 2012-97223

(51) Int. Cl.
*H02P 6/00* (2006.01)
*H02P 21/14* (2006.01)

(52) U.S. Cl.
CPC ...................................... *H02P 21/14* (2013.01)

(58) Field of Classification Search
USPC .............. 318/801, 811, 798, 799, 254.1, 437, 318/400.01, 400.02, 400.07
See application file for complete search history.

(56) References Cited

U.S. PATENT DOCUMENTS 6,229,719 B1 * 5/2001 Sakai et al. ...................... 363/37
6,427,104 B1 * 7/2002 Matsushita et al. .............. 701/41
2003/0058589 A1 * 3/2003 Matsumoto et al. ............. 361/23
2010/0109583 A1 * 5/2010 Maekawa et al. ........ 318/400.02
2013/0278185 A1   10/2013 Suzuki et al.

FOREIGN PATENT DOCUMENTS

| JP | 2001-145398 | 5/2001 |
|---|---|---|
| JP | 2001-309697 | 11/2001 |
| JP | 2002-252991 | 9/2002 |
| JP | 2004-159391 | 6/2004 |
| JP | 2013-225993 | 10/2013 |

OTHER PUBLICATIONS

Suzuki, U.S. Appl. No. 13/867,687, filed Apr. 22, 2013.
Suzuki, U.S. Appl. No. 13/867,319, filed Apr. 22, 2013.
Suzuki, U.S. Appl. No. 13/867,392, filed Apr. 22, 2013.
Suzuki, U.S. Appl. No. 13/867,297, filed Apr. 22, 2013.

* cited by examiner

*Primary Examiner* — Rina Duda
*Assistant Examiner* — Bickey Dhakal
(74) *Attorney, Agent, or Firm* — Nixon & Vanderhye PC (57) ABSTRACT

A control apparatus of an AC motor improves an electric current estimation accuracy of the AC motor. The control apparatus includes an electric current estimation unit that repeatedly performs an inverted dq conversion, a dq conversion, and a correction process. Based on a d/q axis electric current estimate values of a previous cycle, the inverted dq conversion calculates an electric current estimate value of a sensor phase. The dq conversion calculates a d/q axis electric current correction values based on an electric current estimation error of the sensor phase, which is derived from the electric current estimate value and the electric current detection value detected by an electric current detector. The correction process calculates the d/q axis electric current estimate values of a current cycle by correcting the d/q axis electric current estimate values of the previous cycle by using the d/q axis electric current correction values.

3 Claims, 9 Drawing Sheets

AC MOTOR CONTROL APPARATUS

CROSS REFERENCE TO RELATED APPLICATION

This application is based on and claims the benefit of priority of Japanese Patent Application No. 2012-97223 filed on Apr. 22, 2012, the disclosure of which is incorporated herein by reference.

TECHNICAL FIELD

The present disclosure generally relates to a control apparatus of an alternate current (AC) motor.

BACKGROUND

In recent years, electric and hybrid vehicles driven by an alternate current (AC) motor are the focus of attention in terms of their advantageous features that match a social demand for low fuel consumption and low exhaust gas emission.

For instance, in some electric vehicles, the AC motor and a direct current power source of a secondary battery are connected by way of a motor controller, which includes an inverter. The AC motor is driven by converting a direct current voltage of the direct current power source into an alternate current voltage with the inverter. In some hybrid vehicles, two AC motors and the direct current power source of the secondary battery are connected by way of the motor controller, which includes the inverter, to drive the AC motors by converting a direct current voltage of the direct current power source into an alternate current voltage with the inverter.

The control systems of such AC motors in the electric and hybrid vehicles detect two or more phase electric currents in the three-phase AC motor, by two or more electric current sensors. Based on the electric current detected from the sensors, the AC motor is controlled. However, by having many electric current sensors for one AC motor, a reduction of the size, volume, and cost of the three phase output terminals as well as the motor control system as a whole is hindered.

An effort to reduce the cost of the AC motor control system is proposed in, for example, Japanese Patent Laid-Open No. 2001-145398 (patent document 1), which is U.S. Pat. No. 6,229,719. Patent document 1 discloses reducing the number of electric current sensors by detecting the electric current of one of three phases in the AC motor (i.e., U phase) via one current sensor. In particular, based on the electric current detected in one phase (i.e., U) by the current sensor and the electric current estimate values of the other two phases (i.e., V, W phases) in a previous cycle, a d-axis electric current estimate value (i.e., an excitation-origin electric current estimate value) and a q-axis electric current estimate value (i.e., a torque-origin electric current estimate value) are calculated. Based on the smoothed values of the d-axis electric current estimate value and the q-axis electric current estimate value, which may be averaged (i.e., smoothed) by a first-order delay filter, the electric current estimate values in other two phases are also calculated, for controlling the AC motor by using the q-axis electric current estimate value (or, using both of the d-axis electric current estimate value and the q-axis electric current estimate value).

The technique of patent document 1 enables the reduction in volume and cost of the inverter by devising a single phase sensing of electric current, which uses only one electric current sensor for one AC motor. However, depending on an operation condition of the AC motor, such a technique may not yield a sufficiently stable electric current estimation accuracy for controlling the AC motor. Further, an insufficient estimation accuracy of the electric current for the AC motor may lead to, for example, a deteriorated output torque accuracy and an unstable output torque due to the unstable supply of the electric current, and may further lead to a breakdown of the AC motor and the inverter due to an abnormal electric current and/or voltage. More specifically, since the AC motor in the electric or hybrid vehicle is used in various conditions raging from a vehicle parking condition to a high speed travel (i.e., from no torque to a rated maximum torque), the insufficient estimation accuracy may be problematic. Such insufficient estimation accuracy may also be problematic in other types of devices.

SUMMARY

The present disclosure provides for a control apparatus of an alternate current (AC) motor that is equipped with an electric current sensor for detecting an electric current in one of many phases of the AC motor. The control apparatus prevents a deterioration of the estimation accuracy of an output torque of the AC motor to enable a stable control of the AC motor by improving an electric current estimation accuracy for the AC motor.

The apparatus of patent document 1 estimates a d-axis electric current estimate value and a q-axis electric current estimate value based on (i) the electric current detection value in one phase, which is detected by the electric current sensor, and (ii) electric current estimate values of other two phases in a previous cycle. The electric current estimate values in the other two phases (i.e., in non-sensor phases) are calculated based on the smoothed values derived by smoothing the d-axis electric current estimate value and the q-axis electric current estimate value (i.e., the d/q axis electric current estimate values for brevity).

The inventors of the present application have found, after an intensive study of their own, that the above-mentioned technique of patent document 1 yields a high estimation accuracy of the electric current at an extremely low rotation speed of the AC motor, but does not yield a sufficient estimation accuracy of the electric current at higher rotation speeds. That is, the electric current estimate value shifts in a phase delay direction and in an absolute value decreasing direction, which steadily causes a greater estimation error. Whether it is possible to correctly estimate a constant d/q axis electric current value, if the estimate values are set as zero in the estimation process as an initial condition (i.e., zero estimation value of the d/q axis electric current estimate values) is provided at the beginning of the estimation process.

As a result of the study, the inventors of the present application has found that one cause of such increase of the steady estimation error is in the delay of the phases of the electric current estimate values of the other two phases in a previous cycle, which are used for the calculation of the d/q axis electric current estimate values.

The d/q axis electric current estimate values in the other two phases, which are alternate current values in synchronization with the rotation angle of the AC motor, have a phase delay from the electric current detection value in one phase detected in the current cycle, because the AC motor rotates in a process between the previous cycle and the current cycle, which causes such a change of the rotation angle.

Therefore, when calculating the d/q axis electric current estimate values by performing the dq conversion based on the electric current detection value in the one phase and the electric current estimate values in the other two phases, a mismatch of the phase between the one phase of the electric current detection value and the other two phases of the electric current estimate values causes the electric current estimation error, or such error from the previous cycle is kept unchanged, to cause a steady estimation error, thereby deteriorating the estimation accuracy.

Further, as a result of the study, the inventors of the present application has also found that the calculation errors associated with the technique of patent document 1 also cause an increase in the steady estimation error. Specifically, the technique of patent document 1 repeatedly performs, at a predetermined interval: (A) a dq conversion for calculating the d-q axis electric current estimate values based on (i) the electric current detection value in one phase detected by the electric current sensor and (ii) electric current estimate values of other two phases in a previous cycle, (B) a smoothing process for smoothing the d/q axis electric current estimate values, and (C) an inverted dq conversion for calculating the electric current estimate values of the other two phases based on the smoothed d/q axis electric current estimate values. Accordingly, multiplication and division are repeated more than 10 times in one calculation timing in order to perform the dq conversion, the smoothing process, and the inverted dq conversion, thereby causing the calculation error to accumulate.

In other words, the calculation errors of nominal values, which usually are not problematic by itself, cumulatively cause the steady estimation error, because the errors coming from the previous cycle of electric current estimation in a feedback loop are structurally accumulated in the current cycle of the estimation. That is, the accumulated errors become un-ignorable, and such errors may be reduced by an appropriate rounding process, but may not be reduced to zero in principle.

Further, the calculation preformed may be a heavy load for the processors, and may become a restriction factor of the capacity of the processor in the controller of the AC motor.

Therefore, in an aspect of the present disclosure, a control apparatus of an alternate current (AC) motor improves the electric current estimation accuracy of the AC motor. The control apparatus is for an AC motor that includes a three-phase AC motor and an electric current detector for detecting an electric current in a sensor phase, which is one phase of the three phrase AC motor.

The control apparatus includes an electric current estimation unit that repeatedly performs, at a predetermined interval, an inverted dq conversion, a dq conversion, and a correction process to determine d/q axis electric current estimate values.

The inverted dq conversion calculates an electric current estimate value of the sensor phase based on the d/q axis electric current estimate value of a previous cycle in a rotation coordinate system of the AC motor. The dq conversion calculates a d/q axis electric current correction values based on an electric current estimation error of the sensor phase. The electric current estimation error is derived from the electric current estimate value of the sensor phase calculated by the inverted dq conversion and the electric current detection value of the sensor phase detected by the electric current detector.

The correction process calculates the d/q axis electric current estimate values of a current cycle by correcting the d/q axis electric current estimate values of the previous cycle by using the d/q axis electric current correction values determined by the dq conversion.

In such configuration, the electric current estimate values of the previous cycle used in the current calculation are the d/q axis electric current estimate values, which are not the electric current estimate values of the other two phases. As described, the phase delay is caused due to the synchronization of the electric current estimate values of the other two phases with the rotation angle of the AC motor, which constantly changes as alternate current values. The dq conversion for converting such an alternate current value to a direct current value removes the rotation angle factor based on the rotation angle, thereby yielding the d/q axis electric current estimate values as the direct current values. Therefore, even when a change is caused in the rotation angle due to the rotation of the AC motor in a process between the previous cycle and the current cycle, no defect such as a phase delay will be caused.

Further, the electric current estimate value of the sensor phase derived from the inverted dq conversion based on the d/q axis electric current estimate values of the previous cycle has its basis of calculation on the information of the rotation angle of the motor in the current cycle. Therefore, phase matching is enabled between the phase of the electric current estimate value of the sensor phase for the current cycle and the electric current detection value of the sensor phase for the current cycle. Thus, the possibility of a steady error in the estimation is removed (i.e., an electric current estimation error or a "hangover" of such error from the previous cycle in the estimation is removed).

In such manner, the phase delay of the electric current estimate values in the other phase relative to the electric current detection value in the sensor phase, which causes the steady estimation error, is prevented. Therefore, by the single-phase sensing of the electric current, the estimation accuracy of the d/q axis electric current estimate values is improved, which enables an improved accuracy of the electric current estimate value in the AC motor, without compromising the volume and cost reduction requirement of the inverter.

Further, in contrast to the technique in patent document 1, which calculates the electric current estimate values in the other two phases based on (i) the dq conversion based on three phases, one from the electric current detection value from the electric current sensor and two from the electric current estimate value in the other two phases in the previous cycle, and (ii) the d/q axis electric current estimate values, the technique in the present disclosure achieves a reduction in the number of multiplication calculations by devising the calculation to only use the dq conversion and the inverted dq conversion of the sensor phase component. Therefore, the processing load of the control circuit as well as an influence of the calculation errors is reduced for the improvement of the estimation accuracy of the electric current.

Further, when performing the dq conversion, the electric current estimate unit may calculate the d/q axis electric current estimate values based on a value that is calculated as a product of the electric current estimation error in the sensor phase and a gain.

In such manner, when a smoothing process for smoothing the d/q axis electric current estimate values is included, to prevent a steep change of the d/q axis electric current estimate values based on the prevention of a steep change of the d/q axis electric current correction values, the smoothing process may be simplified to a process of multiplying the electric current estimation error by a gain. Thus, a reduction of the number of multiplication calculations from two (in the smoothing process of the d/q axis electric current estimate values) to only one (in multiplication of the electric current estimation error in the sensor phase and the gain) is achieved. That is, the processing load and the calculation error are further reduced.

Further, a power supply for the AC motor may be controlled based on the d/q axis electric current estimate values. The present disclosure prevents the deterioration of the accuracy of the output torque from the AC motor by accurately controlling the power supply for the AC motor by using the d/q axis electric current estimate values, thereby enabling a stable control of the electric current in the AC motor.

BRIEF DESCRIPTION OF THE DRAWINGS

Other objects, features and advantages of the disclosure will become more apparent from the following detailed description disposed with reference to the accompanying drawings, in which.

DETAILED DESCRIPTION

Examples of the present disclosure are described in the following, as an application to a hybrid vehicle, which is driven by an alternate current (AC) motor and an internal combustion engine.

Figure 1:
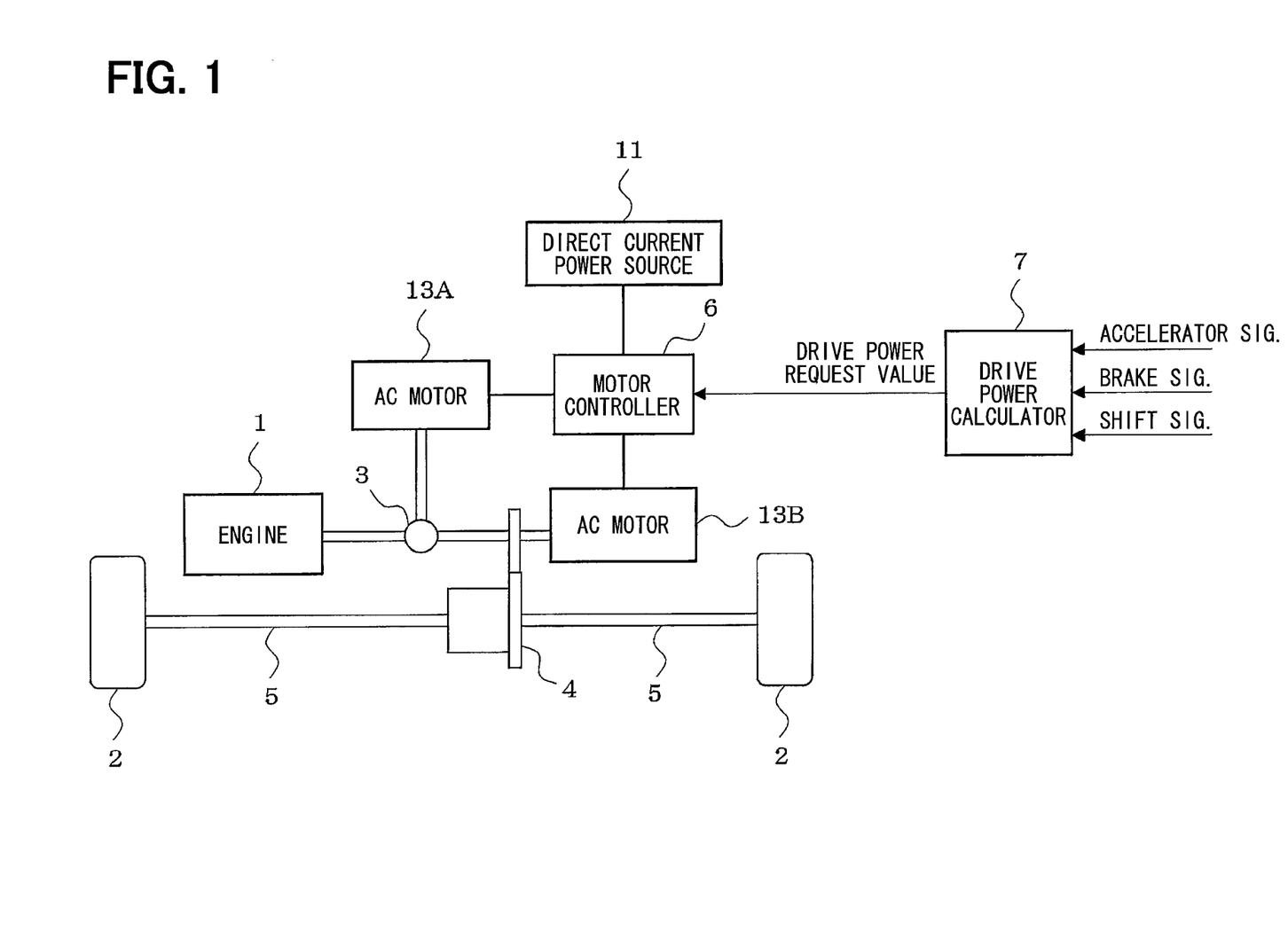
FIG. 1 is a block diagram of a drive system of a hybrid vehicle of the present disclosure.

The present disclosure is described with reference to the drawings. A drive system of a hybrid vehicle is illustrated in FIG. 1. The drive system includes an engine 1, an AC motor 13A (a first motor), and an AC motor 13B (a second motor). The driving power for driving wheels 2 of the vehicle comes from the AC motors 13A, 13B and is transmitted to a shaft of the AC motor 13B, which is combined with an output from the engine 1. Specifically, the crank shaft of the engine 1 is connected to the shaft of the AC motor 13A and to the shaft of the AC motor 13B though a power splitting mechanism 3 (e.g., a planetary gear), and the shaft of the AC motor 13B is further connected to a wheel shaft 5 through a differential gear 4.

Figure 2:
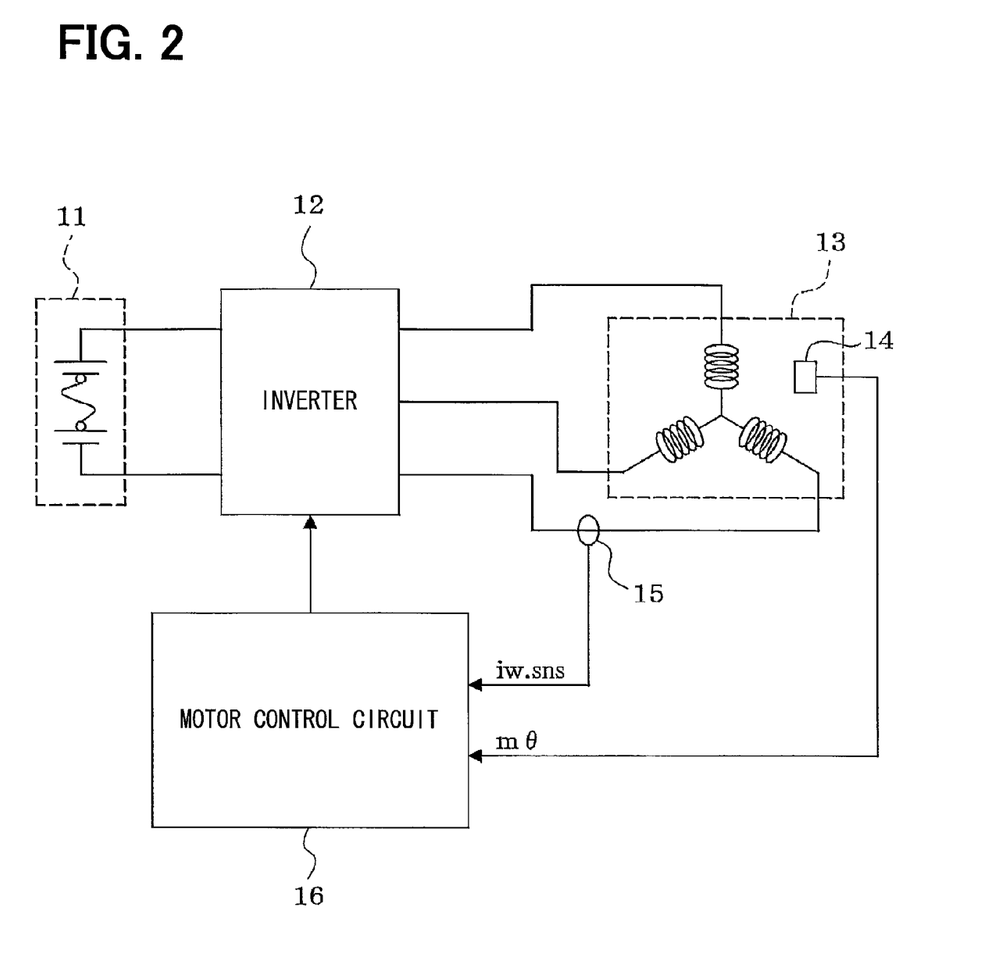
FIG. 2 is a block diagram of an alternate current (AC) motor control system of the drive system.

The AC motors 13A, 13B are connected to a direct current power source 11 through a motor controller 6, which includes, for example, an inverter 12 and a motor control circuit 16 (FIG. 2). The power source 11, which may be a secondary battery, may supply the direct current for the AC motors 13A, 13B or may receive the direct current that is returned (i.e., charged) from the AC motors 13A, 13B through the motor controller 6.

The drive system of the hybrid vehicle also includes a drive power calculator 7 that controls the hybrid vehicle. The drive power calculator 7, which is a computer or a similar component, detects a driving condition of the vehicle by reading signals from various sensors and devices, such as an accelerator sensor, a brake switch, and a shift switch.

The drive power calculator 7 transmits and receives a control signal and a data signal to and from an engine control circuit that controls an operation of the engine 1 and the motor control circuit 16 that controls an operation of the AC motors 13A, 13B. The drive power calculator 7 controls the drive power of the engine 1 and the AC motors 13A, 13B by outputting a drive power request value according to the driving condition of the vehicle.

The AC motor control system in the hybrid vehicle is described next with reference to FIG. 2. The control systems of the AC motors 13A, 13B are substantially the same. Therefore, the following description designates the motors 13A, 13B simply as an AC motor 13.

The direct current power source 11 implemented as a secondary battery is connected to the inverter 12 of three phase voltage control type, and the inverter 12 drives the AC motor 13 (i.e., an electric motor). Further, the inverter 12 may be connected to the direct electric current power source 11 through, for example, a voltage-boost converter.

The AC motor 13 is a three phase permanent magnet-type synchronous motor, which includes a built-in permanent magnet, and is equipped with a rotor position sensor 14 that detects a rotation position (i.e., a rotation angle) of the rotor. Further, an electric current sensor 15 detects an electric current in one phase (i.e., described as a "sensor phase" hereinafter) among plural phases of the AC motor 13. In the present embodiment, the electric current in a W phase is detected as the sensor phase by the electric current sensor 15. Further, the AC motor 13 may be an induction motor or a synchronous motor of other types, other than the permanent magnet-type synchronous motor.

The inverter 12 drives the AC motor 13 by converting a DC voltage into three-phase AC voltage of U, V, W according to a 6 arm voltage instruction signals UU, UL, VU, VL, WU, WL.

The motor control circuit 16 performs a torque control by adjusting the AC voltage that is applied to the AC motor 13 so that an output torque of the AC motor 13 is controlled to have a target torque (i.e., an instructed torque value).

To control the deviation between an electric current instruction value and an electric current estimate value, in which the electric current instruction value is based on the instructed torque value and the electric current estimate value is based on an output of the electric current sensor 15, an electric current feedback (F/B) control of power supply for the AC motor 13 is performed in the following manner.

Figure 3:
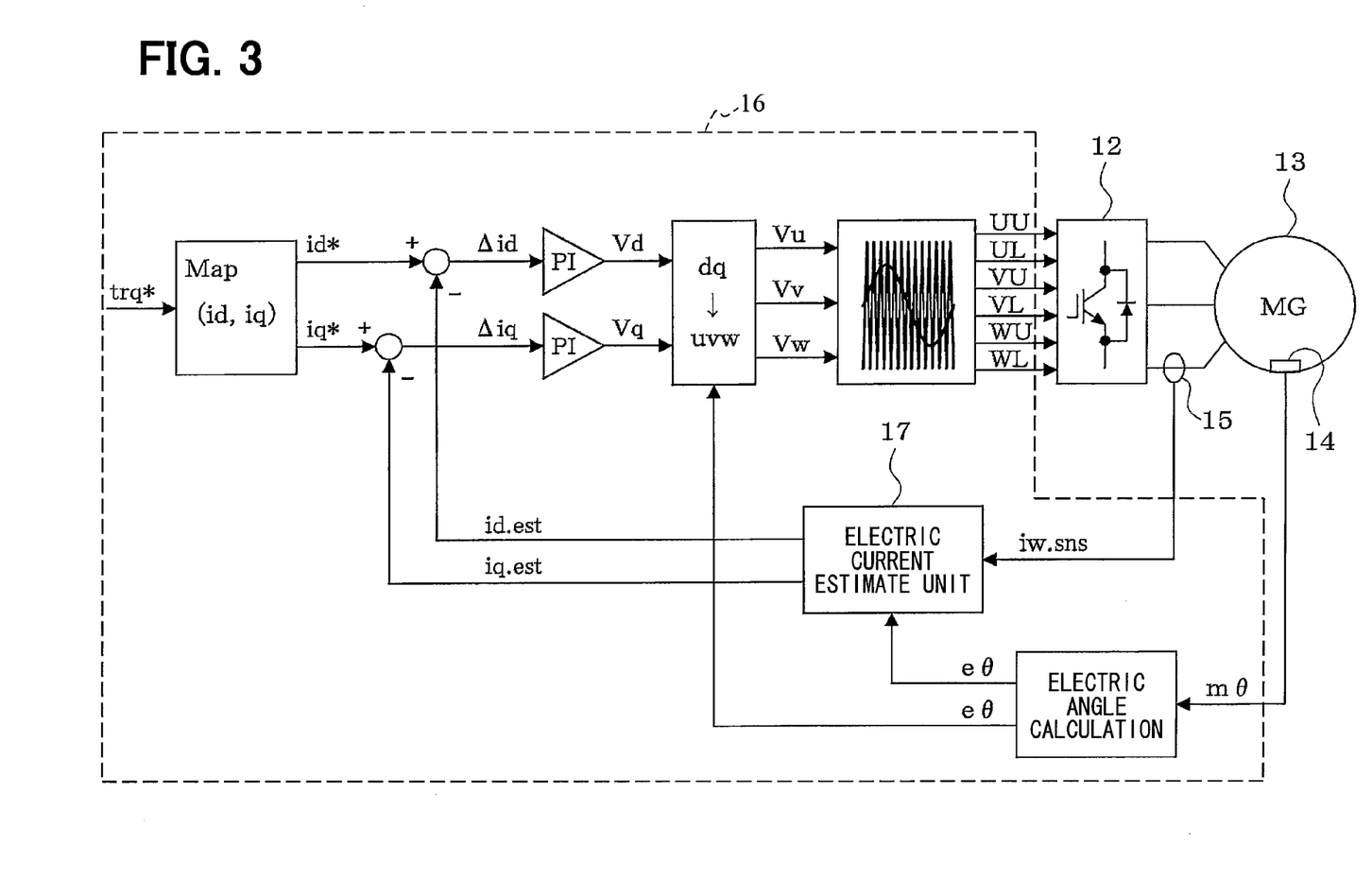
FIG. 3 is a block diagram of a current feedback control of the AC motor control system.

With reference to FIG. 3, the motor control circuit 16 calculates an instructed electric current vector according to, for example, a map or an equation based on an instructed torque value (trq*). The instructed electric current vector is represented in a rotor coordinate system (i.e., a rotating d-q coordinate system) that is set on the rotor of the AC motor 13, as a combination of a d-axis electric current instruction value (id*) and a q-axis electric current instruction value (iq*).

An electric angle (eθ) is calculated based on the rotor position (mθ) of the AC motor 13, which is detected by the rotor position sensor 14. Based on the electric angle (eθ) of the AC motor 13 and the electric current detection value (iw·sns) of the sensor phase (i.e., the W phase), which is detected by the electric current sensor 15, an electric current estimate unit 17 calculates an estimate electric current vector in the rotation coordinate system. The estimate electric current vector includes a d-axis electric current estimate value (id·est) and a q-axis electric current estimate value (iq·est), which may be referred to as the d/q axis electric current estimate value (id·est, iq·est). The electric current estimate unit 17 may be referred to as an electric current estimation unit in claims.

An instructed voltage vector is calculated based on the d-axis electric current estimate value (id·est) and the q-axis electric current estimate value (iq·est). Specifically, a d-axis voltage instruction value (Vd) is calculated according to, for example, a PI control, which reduces a deviation (Δid) between the d-axis electric current instruction value (id*) and the d-axis electric current estimate value (id·est). Similarly, a q-axis voltage instruction value (Vq) is calculated according to the PI control so that a deviation Δiq between the q-axis electric current instruction value (iq*) and the q-axis electric current estimate value (iq·est) is reduced. The d-axis voltage instruction value (Vd) and the q-axis voltage instruction value (Vq) may be referred to as the instructed voltage instruction (Vd, Vq).

Based on the instructed voltage vector (Vd, Vq) and the electric angle (eθ) of the AC motor 13, three phase voltage instruction values Vu, Vv, Vw are calculated. The values Vu, Vv, Vw are converted by, for example, a sine wave PWM control method into three phase 6 arm voltage instruction signals UU, UL, VU, VL, WU, WL, and the signals UU, UL, VU, VL, WU, WL are outputted to the inverter 12. In such manner, the feedback control of the power supply for the AC motor 13 is performed to reduce the deviation between the electric current instruction values (id*, iq*), which are based on the instructed torque value, and the d/q electric current estimate values (id·est, iq·est), which are based on the output of the sensor 15.

Figure 7:
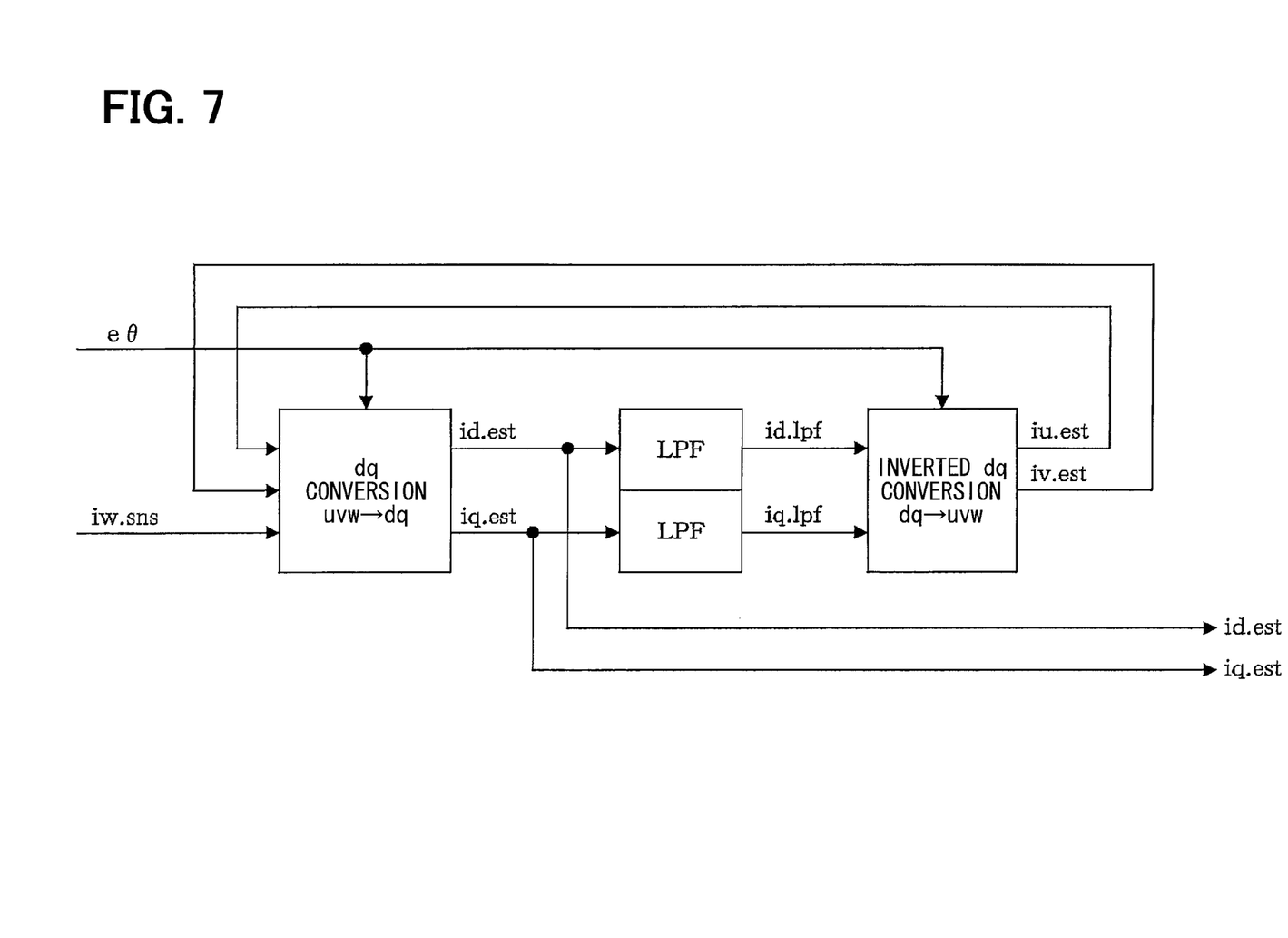
FIG. 7 is a block diagram of a system that determines an electric current estimate as a comparison example.

With reference to FIG. 7, a comparison example of the estimation of the electric current in the AC motor 13 based on the inventors' study is shown. In this example, a system of FIG. 7 estimates an electric current by repeatedly performing a dq conversion and an inverted dq conversion at predetermined intervals. Specifically, the dq conversion calculates the d/q axis electric current estimate values (id·est, iq·est) based on the electric current detection value (iw·sns) in W phase (i.e., the sensor phase) detected by the sensor 15 and the electric current estimate values (iu·est, iv·est) in the other two phases of U and V in a previous cycle. The inverted dq conversion calculates the electric current estimate values (iu·est, iv·est) in the other two phases of U and V based on smoothed values (id·lpf, iq·lpf) by performing a low-pass filter (LPF) process (e.g., an "annealing" process or a first order lag process) on the d/q axis electric current estimate values (id·est, iq·est) derived from the dq conversion.

Figure 8A:
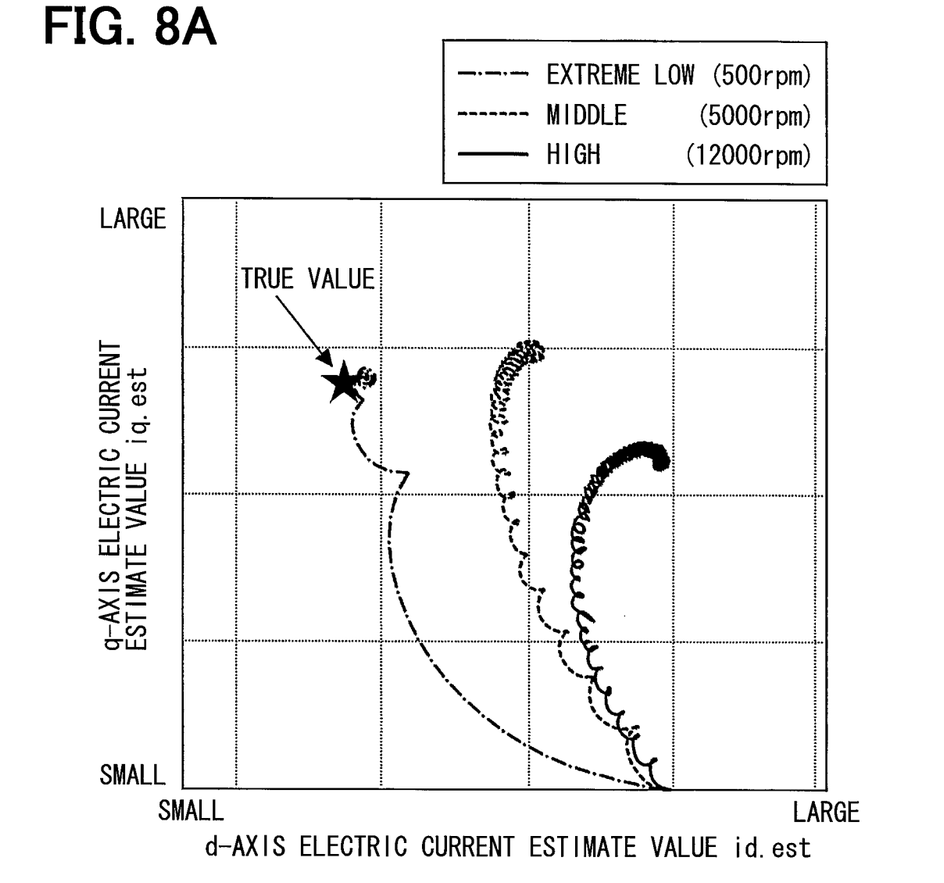
FIGS. 8A and 8B are graphical views of the electric current estimate determined by the system of FIG. 7 as the comparison example.
Figure 8B:
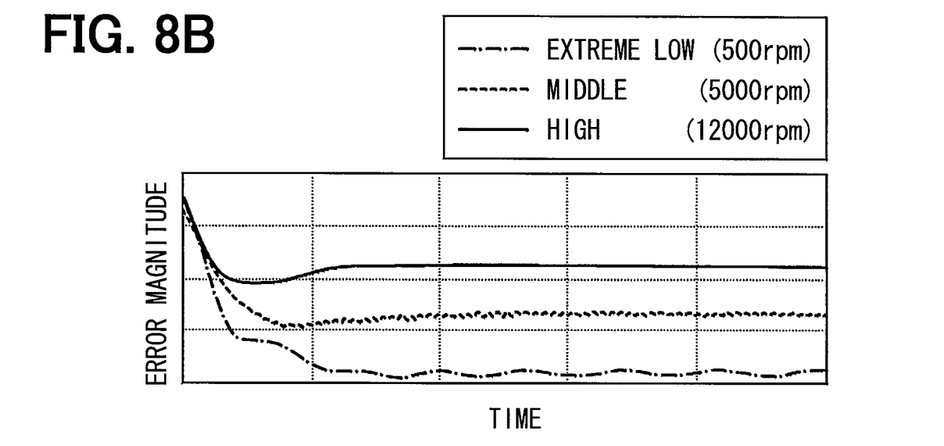

In the example of FIG. 7, the electric current estimation is accurate when the frequency of the electric current (i.e., a rotation speed of the AC motor 13) is very low. However, as shown in FIGS. 8A and 8B, when the frequency of the electric current (i.e., the rotation speed of the AC motor 13) increases, the inventors found that the electric current estimate value shifts in a phase delay direction and in an absolute value decreasing direction, thereby steadily causing a greater estimation error.

As a result of the study, the inventors found that the cause of such increase of the steady estimation error is the delay of the phase of the electric current estimate values of the other two phases in a previous cycle, which are used for the calculation of the d/q axis electric current estimate values (id·est, iq·est).

Specifically, the electric current estimate values (iu·est, iv·est) in the other two phases, which are alternate current values in synchronization with the electric angle (eθ) of the AC motor 13, have a phase delay from the electric current detection value (iw·sns) detected in the W phase (i.e., the sensor phase) in the current cycle by a phase amount of eθ, which is a change in the current cycle, because the AC motor 13 rotates between the previous cycle and the current cycle to cause such a change of the electric angle eθ.

Therefore, when calculating the d/q axis electric current estimate values (id·est, iq·est) by performing the dq conversion based on the electric current detection value (iw·sns) of the sensor phase and the electric current estimate values (iu·est, iv·est) of the other two phases, a mismatch of the phase between the electric current detection value (iw·sns) of the sensor phase and the electric current estimate values (iu·est, iv·est) of the other two phases causes the electric current estimation error to be kept unchanged to have a steady estimation error, thereby deteriorating the estimation accuracy.

Further, the calculations errors associated with the system of FIG. 7, also increases the steady estimation error. In particular, the system of FIG. 7 repeatedly performs at the predetermined interval the dq conversion, a smoothing process for smoothing the d/q axis electric current estimate values (id·est, iq·est), and the inverted dq conversion. During the calculation, multiplication and division are used roughly 12 times in one calculation timing: 6 multiplications for the dq conversion, 2 multiplications for the smoothing process, and 4 multiplications for the inverted dq conversion. Accordingly, the calculation errors associated with the one calculation timing may become the steady estimation error. In other words, the calculation errors, which may be of nominal values, associated with the multiplication and the division cumulatively cause such steady error, because the errors coming from the previous cycle of electric current estimation are structurally accumulated in the current cycle of the estimation. That is, the accumulated errors become un-ignorable in the above-described system. Such errors may be reduced by an appropriate rounding process, but may not be reduced to zero in principle.

To reduce the steady estimation error,—instead of performing the electric current estimation process by using the electric current estimate values (iu·est, iv·est) of the other two phases in the previous cycle, which are the alternate current values, the electric current estimation process is performed as (i) the dq conversion based on the electric angle (eθ) by using the electric current detection value (iw·sns) of the sensor phase detected by the electric current sensor 15, which is an alternate current value, and the electric current estimate values (iu·est, iv·est) of the other two phases and (ii) a calculation for calculating an estimate value based on the d/q axis electric current estimate values (id·lpf, iq·lpf) in the previous cycle from which the phase component in synchronization with the electric angle (eθ) is removed, which is now a direct current value.

Further, to reduce the steady estimation error, which is the calculation error associated with the multiplication and the division, the configuration of the electric current estimation by using the dq conversion and the inverted dq conversion is changed to the following.

The electric current estimation process by using the dq conversion and the inverted dq conversion in FIG. 7 is represented by equations (1) and (2).

$$\begin{bmatrix} id.est(n) \\ iq.est(n) \end{bmatrix} = Cdq \begin{bmatrix} iu.est(n-1) \\ iv.est(n-1) \\ iw.sns(n-1) \end{bmatrix} \quad (1)$$

$$\begin{bmatrix} iu.est(n) \\ iv.est(n) \\ iw.est(n) \end{bmatrix} = Cuvw \begin{bmatrix} id.lpf(n) \\ iq.lpf(n) \end{bmatrix} \quad (2)$$

Further, a difference Δiw(n) between the iw·est(n) and iw·sns(n) is provided in equation (3), and is derived from iw·est(n), which is the electric current estimate value in the sensor phase, and iw·sns(n), which is the electric current detection value.

$$\Delta iw(n) = iw\cdot est(n) - iw\cdot sns(n)$$

$$iw\cdot sns(n) = iw\cdot est(n) - \Delta iw(n) \quad (3)$$

Further, by substituting equation (3) into equation (1), the following equation (4) is formulated.

$$\begin{bmatrix} id.est(n) \\ iq.est(n) \end{bmatrix} = Cdq \begin{bmatrix} iu.est(n-1) \\ iv.est(n-1) \\ iw.sns(n-1) - \Delta iw(n) \end{bmatrix} \quad (4)$$

$$= Cdq \begin{bmatrix} iu.est(n-1) \\ iv.est(n-1) \\ iw.est(n-1) \end{bmatrix} - Cdq \begin{bmatrix} 0 \\ 0 \\ \Delta iw(n) \end{bmatrix}$$

$$= \begin{bmatrix} id.est(n-1) \\ iq.est(n-1) \end{bmatrix} - Cdq^w \Delta iw(n)$$

In this case, the low-pass filter (LPF) of FIG. 7 may be replaced with, for example, the first-order rounding process in the following equation 5, in which Ksm is a rounding coefficient, and is defined by a time constant of the LPF, which is a value (i.e., a design value) equal to or greater than 1.

$$id\cdot lpf(n) = id\cdot lpf(n-1) + (id\cdot est(n) - id\cdot lpf(n-1))/Ksm \quad (5)$$

The first-order rounding function reduces the amount of change from the previous value by dividing, in the second term on the right side of the equation, the difference between the previous value (i.e., "(n−1)") and the current value (i.e, "(n)") with the rounding coefficient Ksm, thereby smoothing the value. In equation (4), since the difference between previous value and the current value is calculated based on the estimation error of the sensor phase (i.e., W phase) in the second term on the right side of the equation, performing the first-order rounding process on the d/q axis electric current estimate values id·est, iq·est is equivalent to dividing the second term on the right side of the equation, which is the amount of change, by the rounding coefficient Ksm.

Therefore, the electric current estimation process including LPF may be modified to the following equation (6).

$$\begin{bmatrix} id.lpf(n) \\ iq.lpf(n) \end{bmatrix} = \begin{bmatrix} id.lpf(n-1) \\ iq.lpf(n-1) \end{bmatrix} - \frac{1}{Ksm} Cdq^w \Delta iw(n) \quad (6)$$

$$= \begin{bmatrix} id.lpf(n-1) \\ iq.lpf(n-1) \end{bmatrix} - \frac{1}{Ksm} \sqrt{\frac{2}{3}} \begin{bmatrix} \cos \theta w(n) \\ -\sin \theta w(n) \end{bmatrix} \Delta iw(n)$$

Here, θw(n) is a phase value of the sensor phase (i.e., W phase), which may be, for example, eθ+120°.

Further, based on the d/q axis electric current estimate values id·est, iq·est in the previous cycle, the electric current estimate value iw·est(n) in the sensor phase may be represented by the following equation (7), which is a value derived from the inverted dq conversion for the sensor phase only.

$$iw.est(n) = \quad (7)$$

$$Cuvw \begin{bmatrix} id.lpf(n-1) \\ iq.lpf(n-1) \end{bmatrix} = \sqrt{\frac{2}{3}} [\cos \theta w(n) \quad -\sin \theta w(n)] \begin{bmatrix} id.lpf(n-1) \\ iq.lpf(n-1) \end{bmatrix}$$

Figure 4:
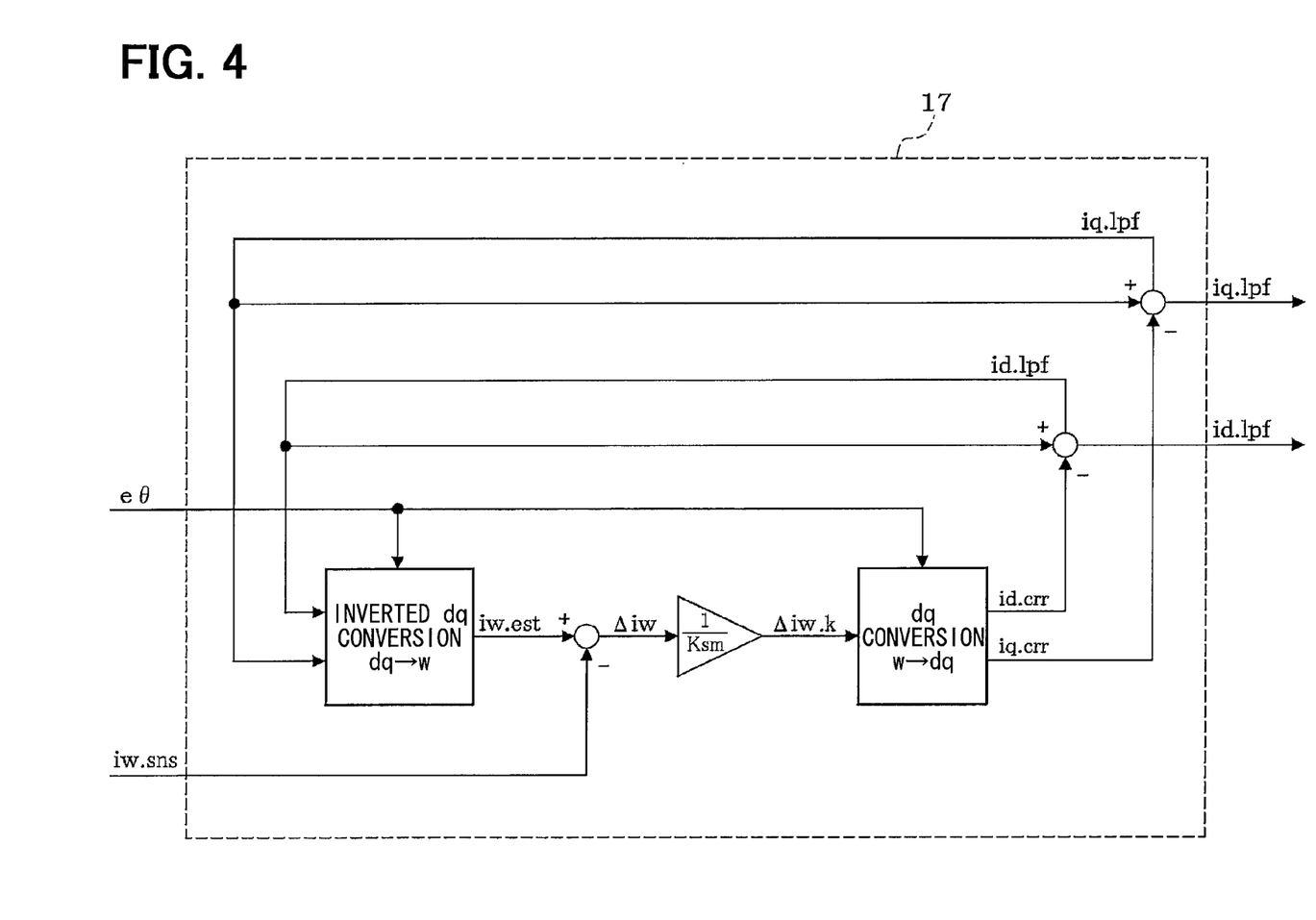
FIG. 4 is a block diagram of an electric current estimate unit of the AC motor control system of the present disclosure.

In consideration of the above, the present disclosure provides, as shown in FIG. 4, the electric current estimation unit 17 that repeatedly performs, at a predetermined interval T, the inverted dq conversion, the dq conversion, and the correction process. Based on the d/q axis electric current estimate values id·lpf, iq·lpf of the previous cycle (i.e., "(n−1)"), the inverted dq conversion calculates the electric current estimate value of the sensor phase (iw·est). The dq conversion calculates the d/q axis electric current correction values id·crr, iq·crr based on a value Δiw·k, which is a product of the electric current estimation error Δiw in the sensor phase and a gain (1/Ksm<1). The electric current estimation error Δiw is derived from (a) the electric current estimate value iw·est in the sensor phase from the inverted dq conversion and (b) the electric current detection value iw·sns of the sensor phase detected by the electric current sensor 15. The correction process calculates the d/q axis electric current estimate values id·lpf, iq·lpf of the current cycle (i.e., "(n)") by correcting the d/q axis electric current estimate values id·lpf, iq·lpf of the previous cycle by using the d/q axis electric current correction values id·crr, iq·crr from the dq conversion.

According to such configuration, even when the electric angle eθ changes due to the rotation of the AC motor between the previous cycle and the current cycle, the electric current estimation process in the current cycle does not have the delay of phase because the electric current estimation process in the current cycle is performed based on the d/q axis electric current estimate values id·lpf, iq·lpf of the previous cycle, which are not the alternate electric current values but the direct electric current values.

Further, since the electric current estimate values iw·est of the sensor phase is calculated by performing the inverted dq conversion on the electric current estimate values id·lpf, iq·lpf of the previous cycle based on the electric angle eθ of the current cycle, such estimate value iw·est has a matching phase with the electric current detected value iw·sns detected by the electric current sensor 15 at the current calculation timing. Therefore, the chance of having the steady estimation error is significantly reduced or eliminated. That is, the phase delay or the mismatched phase is s no longer a factor for influencing the steady estimation error.

Further, in the estimation process, (i) for the inverted dq conversion, multiplication is performed twice to calculate the electric current estimate value iw·est in the sensor phase based on the d/q axis electric current estimate value id·lpf, iq·lpf of the previous cycle, (ii) multiplication is performed once to calculate the value Δiw·k, which is a product of the electric current estimation error Δiw in the sensor phase and the gain 1/Ksm, and (iii) for the dq conversion, multiplication is performed twice to calculate the electric current correction values id·crr, iq·crr based on the electric current estimation error Δiw·k that has the gain multiplied thereon. Therefore, the number of multiplications is about five, which is less than half of the number of multiplications of the system of FIG. 7.

In the above, the LPF is equivalently replaced with the gain multiplication process that multiply the electric current estimation error Δiw of the sensor phase by gain 1/Ksm, which enables further reduction of the total number of multiplications by reducing the before-replacement number of two to after-replacement number of one.

Further, as understood from FIG. 4, before-LPF the d/q axis electric current estimate values (id·est, iq·est) will not appear in the calculation. Therefore, if it is necessary, the d/q axis electric current correction values id·crr, iq·crr that are calculated based on before-gain-multiplication electric current estimation error Δiw of the sensor phase may be used for correction.

Figure 5:
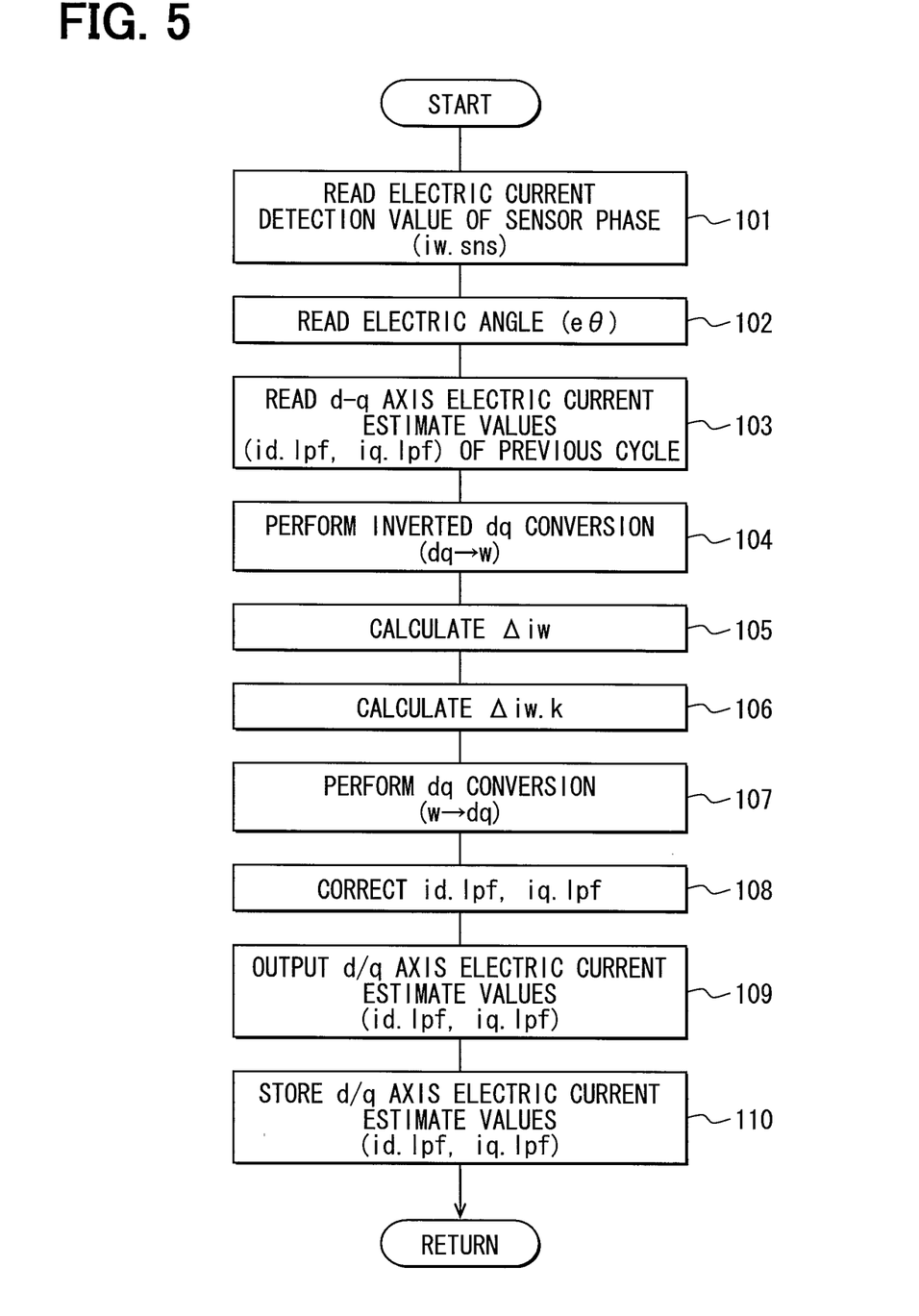
FIG. 5 is a flowchart of an electric current estimation routine performed by a motor control circuit.

The electric current estimation of the present embodiment is performed by the motor control circuit 16 as an electric current estimation routine shown in FIG. 5.

The electric current estimation routine of FIG. 5 is executed during a power on period of the motor control circuit 16 at a predetermined calculation cycle T in a repeated manner. After the start of execution of the routine, the motor control circuit 16 reads the electric current detection value iw·sns of the sensor phase (i.e., W phase), which is detected by the electric current sensor 15, at 101 and reads the electric angle eθ at 102. The electric angle eθ is calculated from the rotor position mθ of the AC motor 13, which is detected by the rotor position sensor 14.

The motor control circuit 16 then reads the d/q axis electric current estimate values id·lpf, iq·lpf of the previous cycle at S103. In the first cycle of the routine just after the start of the power supply for the circuit 16, for which there is no previous cycle, the d/q axis electric current estimate values id·lpf, iq·lpf of the previous cycle are respectively set to zero. In other words, the initial values of id·lpf and iq·lpf are both zero.

The motor control circuit 16 then performs the inverted dq conversion at 104. In particular, based on the d/q axis electric current estimate values id·lpf, iq·lpf of the previous cycle, the electric current estimate value iw·est of the sensor phase (i.e., in W phase) is calculated. In this inverted dq conversion, the electric current estimate value iw·est of the sensor phase (i.e., in W phase) is calculated.

The electric current estimation error Δiw of the sensor phase (i.e., in W phase) is then calculated, at 105, as a difference between the electric current estimate value iw·est of the sensor phase (i.e., in W phase) and the electric current detection value iw·sns of the sensor phase (i.e., in W phase), which is detected by the electric current sensor 15.

The motor control circuit 16 then calculates Δiw·k, at 106, by multiplying the electric current estimation error Δiw of the sensor phase by the gain 1/Ksm. The dq conversion is then performed, at 107, to calculate the d/q axis electric current correction values id·crr, iq·crr based on the electric current estimation error Δiw·k of the sensor phase, which is a value after the multiplication by the gain 1/Ksm. In this dq conversion, the d/q axis electric current correction values id·crr, iq·crr is calculated.

The motor control circuit 16 then performs the correction process, at 108, to calculate the d/q axis electric current estimate values id·lpf, iq·lpf of the current cycle. In particular the d/q axis electric current estimate values id·lpf, iq·lpf of the current cycle is calculated by correcting the d/q axis electric current estimate values id·lpf, iq·lpf of the previous cycle by using the d/q axis electric current correction values id·crr, iq·crr.

The d/q axis electric current estimate values id·lpf, iq·lpf of the current cycle is then outputted at 109. The output values id·est, iq·est are, for example, used for the electric current F/B control described above.

The motor control circuit 16 then stores the d-axis electric current estimate value id·lpf and the q-axis electric current estimate value iq·lpf in the buffer (i.e., in a memory area), at 110, before concluding the routine. The d/q axis electric current estimate values are used in the next execution cycle of the routine (i.e., in the next execution time of the electric current estimation process), in which the values serve as the d/q axis electric current estimate values of the previous cycle.

As described above, the inverted dq conversion calculates the electric current estimate value iw·est of the sensor phase (i.e., in W phase) based on the d/q axis electric current estimate values id·lpf, iq·lpf of the previous cycle, and a dq conversion calculates the d/q axis electric current correction values id·crr, iq·crr based on the electric current estimation error Δiw·k, which is calculated as a value derived from the multiplication of the electric current estimation error Δiw by the gain 1/Ksm. The electric current estimation error Δiw is based on iw·est of the sensor phase (i.e., in W phase) from the inverted dq conversion and iw·sns of the sensor phase (i.e., in W phase) detected by the sensor 15. After the dq conversion, the correction process calculates the d/q axis electric current estimate values id·lpf, iq·lpf of the current cycle by correcting the d/q axis electric current estimate values id·lpf, iq·lpf of the previous cycle by using the d/q axis electric current correction values id·crr, iq·crr from the dq conversion.

Figure 6A:
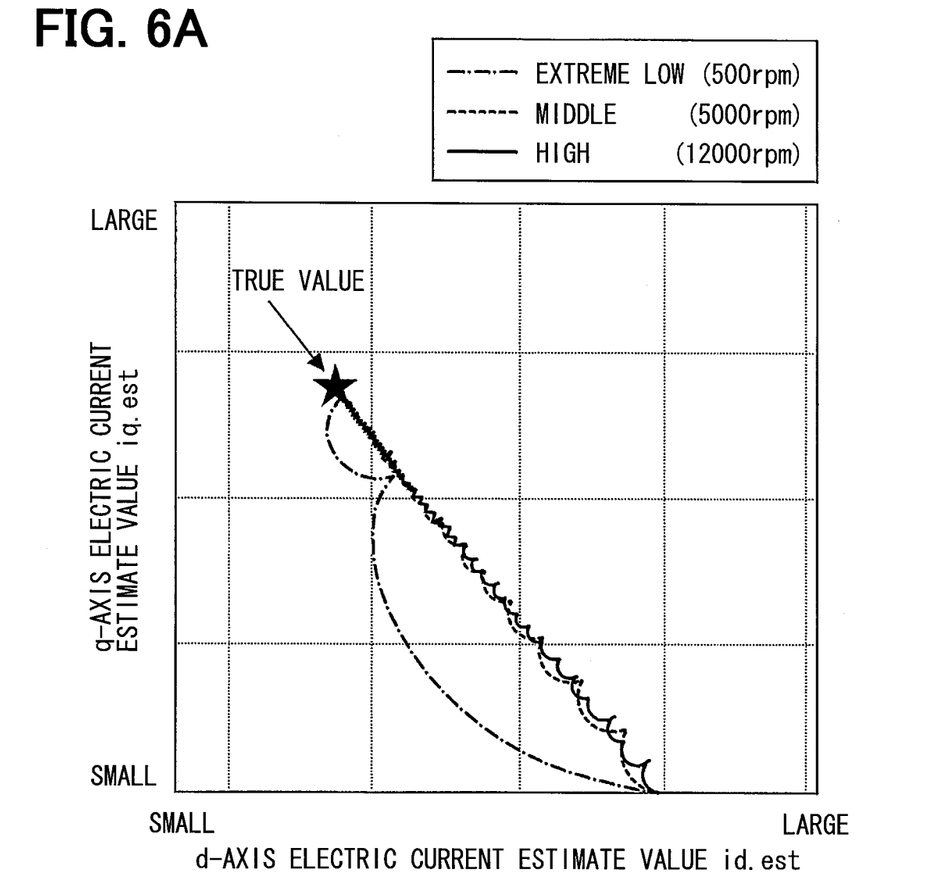
FIGS. 6A and 6B are graphical views of an electric current estimate determined by the electric current estimate unit of FIG. 4.
Figure 6B:
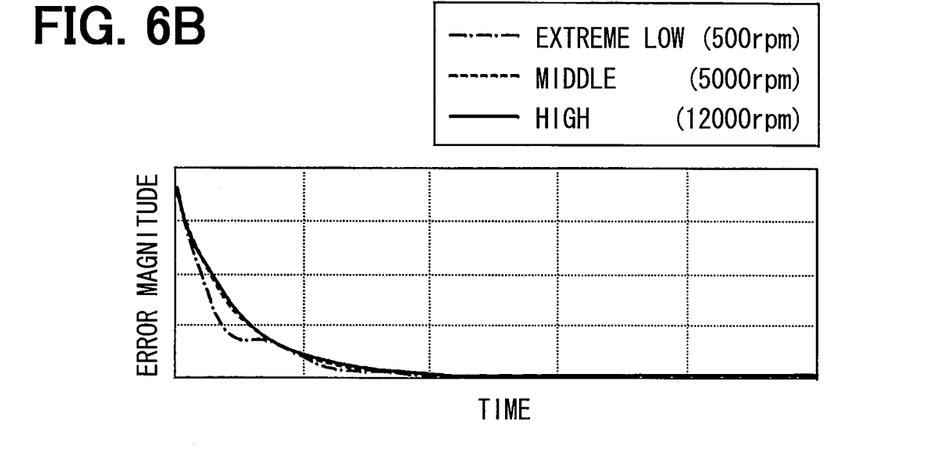

According to such configuration, as shown in FIGS. 6A and 6B, even when the electric angle eθ changes due to the rotation of the AC motor between the previous cycle and the current cycle, the electric current estimation process in the current cycle does not have the delay of phase, because the electric current estimation process in the current cycle is performed based on the d/q axis electric current estimate values id·lpf, iq·lpf of the previous cycle, which are not the alternate electric current values but the direct electric current values.

Further, since the electric current estimate values iw·est in the sensor phase is calculated by performing the inverted dq conversion on the electric current estimate values id·lpf, iq·lpf of the previous cycle based on the electric angle eθ of the current cycle, the estimate value iw·est has a matching phase with the electric current detection value iw·sns detected by the electric current sensor 15 at the current calculation timing. Therefore, the chance of having the steady estimation error is significantly reduced or eliminated. That is, the phase delay or the mismatched phase is no longer a factor for influencing the steady estimation error.

Further, in the estimation process, (i) for the inverted dq conversion, multiplication is performed twice to calculate the electric current estimate value iw·est based on the d/q axis electric current estimate value id·lpf, iq·lpf of the previous cycle, (ii) multiplication is performed once to calculate the value Δiw·k, which is a product of the electric current estimation error Δiw of the sensor phase and the gain 1/Ksm, and (iii) for the dq conversion, multiplication is performed twice to calculate the electric current correction values id·crr, iq·crr based on the electric current estimation error Δiw·k that has the gain multiplied thereon. Therefore, the number of multiplications is about five, which is less than half of the number of multiplications of the system of FIG. 7.

By the single-phase sensing of the electric current, the estimation accuracy for estimating the d/q axis electric current estimate values id·lpf, iq·lpf is improved, which leads to an improved accuracy of the electric current estimate value in the AC motor, without compromising the volume or cost reduction requirement of the inverter. The d/q axis electric current estimate values id·lpf, iq·lpf are more accurately estimated at various motor speeds than the electric current estimate values determined by the system of FIG. 7.

In the present disclosure, the dq conversion calculates the d/q axis electric current correction values id·crr, iq·crr based on the electric current estimation error Δiw·k, which is calculated as a value derived from the multiplication of the electric current estimation error Δiw of the sensor phase by the gain 1/Ksm. Therefore, a steep change of the d/q axis electric current correction values id·crr, iq·crr is prevented, and thus a steep change of the d/q axis electric current estimate values id·lpf, iq·lpf is prevented.

Further, Ksm in such rounding process is a rounding coefficient, and is a value (i.e., a design value) equal to or greater than 1, so that the time constant of LPF is defined as a predetermined calculation interval T×Ksm. If the value of Ksm is equal to 1, it is equivalent to a non-use of LPF.

Since the power supply for the AC motor 13 is controlled by a feed-back (F/B) control of the d/q axis electric current estimate values id·lpf, iq·lpf, which are accurately calculated, the output of the torque from the AC motor 13 is accurately and stably controlled by such F/B control of the electric current.

The direct estimation of the d/q axis electric current estimate values id·lpf, iq·lpf based on the electric current detection value in one phase (i.e., the sensor phase) and the F/B control of the electric current for the AC motor 13 based on such direct estimation prevents, in principle, a secondary fluctuation of the output torque caused by the error of gains between two or more electric current detection sensors (i.e., the torque fluctuation due to the fluctuation of the d/q axis electric current at an electric current secondary frequency is prevented).

By using an electric current sensor in only one phase (i.e., a single-phase sensing of electric current), the error associated with the estimation accuracy of the electric current in the AC motor influences the torque fluctuation of the AC motor. However, based on the present disclosure, the torque fluctuation of the AC motor 13 is reduced due to the reduction of the error associated with the electric current estimation, thereby diminishing the vibration of a device having the AC motor control system that uses the single-phase sensing of the electric current. Therefore, the control of the in-vehicle motor based on the present disclosure is especially advantageous for achieving a high standard of comfort and sophisticated drivability for the vehicle occupant.

The present disclosure may be changed or modified in the following manner.

The disclosure above provides that the d/q axis electric current estimate values id·lpf, iq·lpf are calculated by using the d/q axis electric current correction values that are derived from the dq conversion of after-gain-multiplication electric current estimation error $\Delta iw \cdot k$ of the sensor phase, which enables the values id·lpf, iq·lpf to be equivalent to the smoothed values from a LPF process. Also, such LPF-processed-equivalent d/q axis electric current estimate values id·lpf, iq·lpf are used for the F/B control of the electric current and are also used for the next electric current estimation process at the next calculation timing as the d/q axis electric current estimate values id·lpf, iq·lpf from the previous cycle. The d/q axis electric current estimate values may be changed or modified in the following manner.

For instance, by omitting the LPF process, the d/q axis electric current estimate values id·est, iq·est may be calculated by using the d/q axis electric current correction values that are derived from the dq conversion of the electric current estimation error $\Delta iw$ of the sensor phase. The d/q axis electric current estimate values id·est, iq·est may be used for the F/B control of the electric current and may also be used for the electric current estimation process at the next calculation timing as the d/q axis electric current estimate values id·est, iq·est from the previous cycle.

In another variation, the d/q axis electric current estimate values id·lpf, iq·lpf may be calculated by using the d/q axis electric current correction values that are derived from the dq conversion of after-gain-multiplication electric current estimation error $\Delta iw \cdot k$ of the sensor phase, which enables the values id·lpf, iq·lpf to be equivalent to the smoothed values from a LPF process. The LPF-processed-equivalent d/q axis electric current estimate values id·lpf, iq·lpf may be used for the next electric current estimation process at the next calculation timing as the d/q axis electric current estimate values id·lpf, iq·lpf from the previous cycle. A before-LPF d/q axis electric current estimate values id·est, iq·est may be calculated by using the d/q axis electric current correction values that are derived from the dq conversion of the electric current estimation error $\Delta iw$ of the sensor phase, and such before-LPF d/q axis electric current estimate values id·est, iq·est may be used for the F/B control of the electric current.

Accordingly, when the LPF-processed-equivalent d/q axis electric current estimate values id·lpf, iq·lpf are used at the next calculation timing as the d/q axis electric current estimate values id·lpf, iq·lpf from the previous cycle, it advantageously improves the stability of the F/B control by preventing a steep change of the d/q axis electric current estimate values.

Also, based on the variations, when the before-LPF d/q axis electric current estimate values id·est, iq·est are used for the F/B control of the electric current, it advantageously improves the controllability of the F/B control by reflecting a greater amount of information to the F/B control of the electric current.

Further, in the second variation two dq conversions are required: (1) the dq conversion of after-gain-multiplication electric current estimation error $\Delta iw \cdot k$ of the sensor phase to calculate the d/q axis electric current correction values, and (2) the dq conversion of the electric current estimation error $\Delta iw$ of the sensor phase to calculate the d/q axis electric current correction values. However, even by using two dq conversions, the number of multiplications in the inverted dq conversion and the dq conversion is reduced in comparison to the system of FIG. 7, thereby reducing the processing load of the motor control circuit 16. Further, the before-LPF d/q axis electric current estimate values id·est, iq·est is used only for the F/B control of the electric current and is not used in the next calculation, which prevents the accumulation of errors in the calculation results, thereby preventing the deterioration of the calculation accuracy.

The LPF in FIG. 7 is assumed as the first-order rounding process, and, as an equivalent replacement of such LPF, the electric current estimation error $\Delta iw$ of the sensor phase multiplied by the gain 1/Ksm is used in the dq conversion to calculate the d/q axis electric current correction values id·crr, iq·crr. However, even when the LPF in FIG. 7 is other than the first-order rounding process, an equivalent replacement of such LPF may be realized by defining the coefficient Ksm based on the time constant of the LPF. By defining the coefficient Ksm as a variable rather than a constant and by increasing a degree of freedom of the calculation of the d/q axis electric current correction values id·crr, iq·crr based on such definition of Kxm, various kinds of LPF is equivalently simulated. However, since the present disclosure aims at calculation error reduction and process load reduction based on a simplification of processing, the schemes in the above-described disclosure and variations are preferable.

An electric current estimate error of the sensor phase is calculated as a difference between the electric current estimate values and the electric current detection value of the sensor phase. However, an electric current estimate error may also be calculated as a ratio of, for example, the electric current estimate values and the electric current detection value of the sensor phase.

Further, the detection of the electric current by using the electric current sensor in W phase (i.e., in the sensor phase), in the present disclosure may be changed to another configuration, such as a detection of the electric current by using the electric current sensor in U phase or in V phase.

Figure 9:
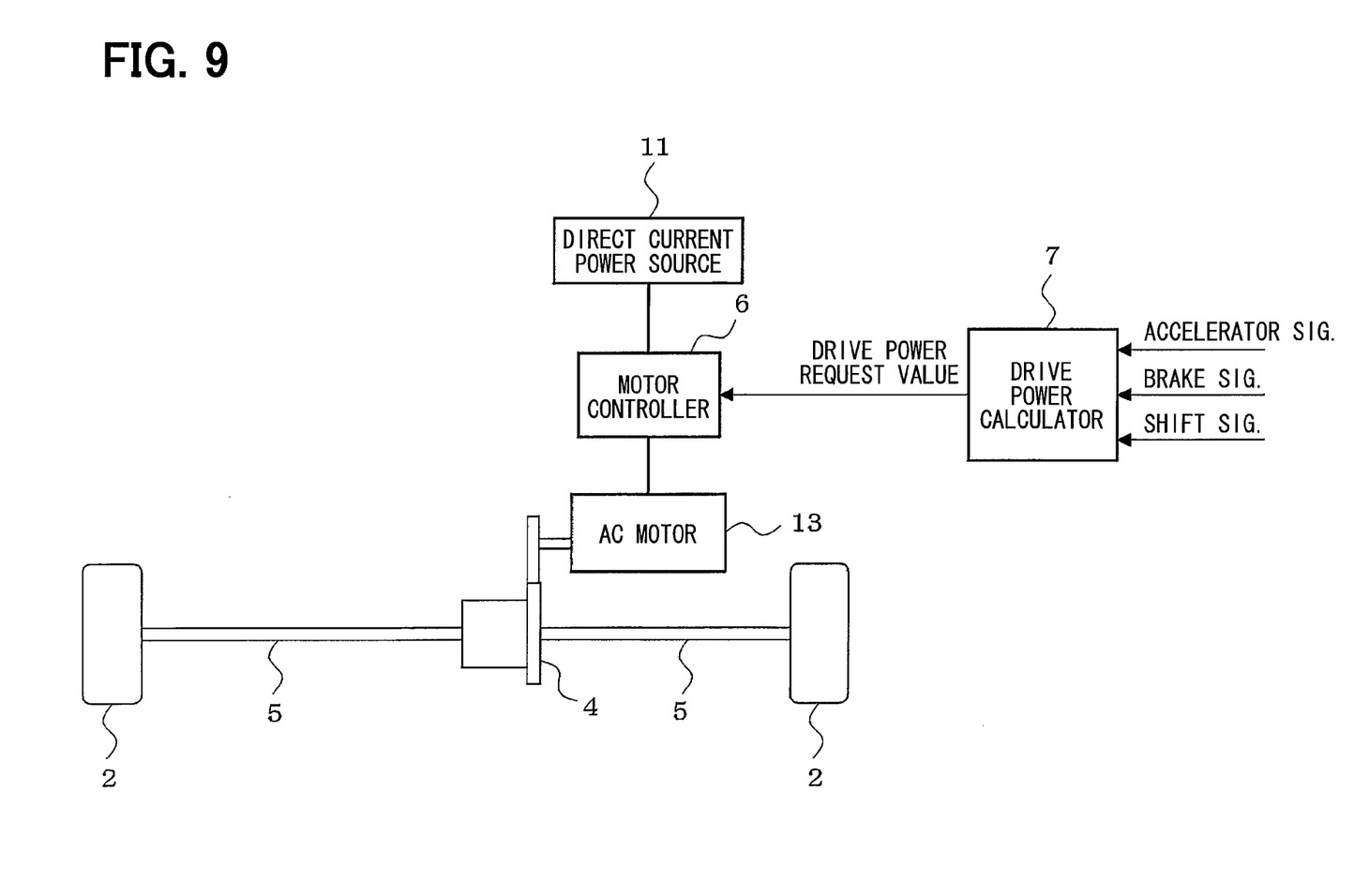
FIG. 9 is a block diagram of a drive system of a battery vehicle of the present disclosure.

The present disclosure may be applicable to a drive system of an electric vehicle shown in FIG. 9. More practically, the drive system of the electric vehicle may have the AC motor 13 installed in the vehicle, and may drive wheels 2 by a driving force from the AC motor 13. The AC motor 13 is connected to a direct current power source 11 through a motor controller 6, which includes, for example, an inverter 12 (FIG. 2) and a motor control circuit 16 (FIG. 2). That is, the power source 11 having a secondary battery or the like may supply the direct current for the motor 13 through the controller 6, or may receive the direct current from the motor 13 through the controller 6.

The drive power calculator 7 is a computer or a similar part that controls the hybrid vehicle, and detects a vehicle's driving condition by reading signals from various sensors and devices such as an accelerator sensor, a brake switch, a shift switch and the like (sensors and switches not illustrated).

The drive power calculator 7 transmits and receives a control signal, a data signal and the like to and from the motor control circuit 16 that controls an operation of the AC motor 13, and controls the drive power of the AC motor 13 by outputting a drive power request value according to the driving condition of the vehicle.

The present disclosure, i.e., the drive system described above, may also be applicable to such drive system of the electric vehicle, for achieving the improved accuracy of the electric current estimation for the control of the AC motor, by devising the single-phase sensing of electric current (one sensor for one motor), which achieves the cost reduction as well.

Furthermore, the configuration of the above embodiment, which is an application of the present disclosure to a system having one set of the inverter and the motor, may be changed to different configurations, such as a hybrid system in FIG. 1, e.g., a system having two or more sets of the inverter and the motor.

Furthermore, the present disclosure may also be applicable to the AC motor control apparatus in various systems other than the electric vehicle system, or the hybrid vehicle system described above.

Such changes and modifications are to be understood as being within the scope of the disclosure as defined by the appended claims.

What is claimed is:

1. A control apparatus of an alternate current AC motor, which includes a three-phase AC motor and an electric current detector for detecting an electric current, as an electric current detection value, in a sensor phase, which is one of three phases of the three-phase AC motor, the control apparatus comprising: an electric current estimation unit is configured to repeatedly perform, at a predetermined interval, an inverted dq conversion, a dq conversion, and a correction process, the electric current estimation unit determining a d/q axis electric current estimate values in a rotation coordinate system of the AC motor based on the electric current detection value in the sensor phase, wherein
   the inverted dq conversion calculates an electric current estimate value of the sensor phase based on the d/q axis electric current estimate value of a previous cycle that is previously calculated and stored in the memory,
   the dq conversion calculates a d/q axis electric current correction values based on an electric current estimation error of the sensor phase, which is derived from the electric current estimate value of the sensor phase calculated by the inverted dq conversion and the electric current detection value of the sensor phase detected by the electric current detector, and
   the correction process calculates the d/q axis electric current estimate values in the rotation coordinate system of the AC motor for a current cycle by correcting the d/q axis electric current estimate values of the previous cycle by using the d/q axis electric current correction values calculated by the dq conversion.

2. The control apparatus of claim 1, wherein
   the electric current estimation unit is configured to calculate the d/q axis electric current estimate values based on a product of the electric current estimation error of the sensor phase and a gain, when performing the dq conversion.

3. The control apparatus of claim 1 further comprising:
   a control unit configured to control a power supply for supplying the electric current for the AC motor based on the d/q axis electric current estimate values.

* * * * *